United States Patent [11] 3,572,445

| [72] | Inventors | Clarence B. Richey |
| --- | --- | --- |
| | | Fresno; |
| | | Ronald E. Rasmussen, Sanger, Calif. |
| [21] | Appl. No. | 783,445 |
| [22] | Filed | Nov. 5, 1968 |
| [45] | Patented | Mar. 30, 1971 |
| [73] | Assignee | Massey Ferguson Inc. |
| | | Des Moines, Iowa |

[54] LIFT TYPE DISK HARROW
13 Claims, 9 Drawing Figs.

[52] U.S. Cl............................................. 172/445,
172/458, 172/581, 172/597
[51] Int. Cl...................................... A01b 59/06,
A01b 63/02
[50] Field of Search............................. 172/445,
458, 581, 588, 597; 172/596

[56] References Cited
UNITED STATES PATENTS

| 1,421,047 | 6/1922 | Ward............................ | 172/588 |
| --- | --- | --- | --- |
| 1,718,797 | 6/1929 | Mowry......................... | 172/588 |
| 2,583,830 | 1/1952 | Goble........................... | 172/445X |
| 2,775,086 | 12/1956 | Vaughn et al................ | 172/588 |
| 3,080,931 | 3/1963 | Heckathorn.................. | 172/458X |
| 3,460,630 | 8/1969 | Richey......................... | 172/581X |

Primary Examiner—Robert E. Pulfrey
Assistant Examiner—C. Coughenour
Attorney—Gerhardt, Greenlee & Farris ABSTRACT: An offset disk harrow adapted to be connected to a three point tractor hitch which has a frame with a mast and a hitch beam, a front gang pivotally attached to the front of the frame and rear gang pivotally attached to one end of the front gang and slidably connected to the rear portion of the hitch beam. A mechanical linkage extends between the harrow and the tractor in such a manner that when the tractor operator causes the harrow to lift, both gangs are automatically folded forward into a position perpendicular to the centerline of the tractor. Another version uses a hydraulic cylinder to fold the gangs.

Patented March 30, 1971

INVENTORS.
CLARENCE B. RICHEY
RONALD E. RASMUSSEN
BY Tweedale & Gerhardt
ATTORNEYS.

INVENTORS.
CLARENCE B. RICHEY
RONALD E. RASMUSSEN
BY
Tweedale & Gebhardt
ATTORNEYS.

INVENTORS.
CLARENCE B. RICHEY
RONALD E. RASMUSSEN

Patented March 30, 1971

INVENTORS
CLARENCE B. RICHEY
BY RONALD E. RASMUSSEN

Tweedale & Gerhardt

ATTORNEYS.

LIFT TYPE DISK HARROW

This invention relates generally to agricultural implements and more particularly to a relatively heavy tractor mounted offset disc harrow that is foldable towards the tractor so that the harrow can be fully supported by the tractor off the ground when it is desired to transport the implement from one place to another.

Disc harrows, when mounted on tractor power lift mechanisms, are old and well-known in the art. In recent years, power lift mechanisms have become standard on larger tractors. With larger tractors, the implements have also become larger and much heavier so that the lift capacity of the tractor is exceeded. Expensive wheel transport or trailer arrangements are therefore needed to transport the implement behind the tractor.

To overcome this problem, several arrangements have been developed to move the center of gravity of the implement forward toward the tractor. One solution to the problem has been to pivotally mount the gangs in such a manner that they can be moved toward the tractor by a complicated lever mechanism separately actuated by the tractor operator. This lever mechanism has not worked well on large harrows because the joints in the levers can not support the weight of a large heavy rear gang. Another solution has been to mount the front gang to the frame at fixed points and to pivotally mount one end of the rear gang to an end of the front gang and slidably connect the rear gang to a hitch beam. This solution does away with complicated lever mechanisms and provides a beam which can support the rear gang. However, this arrangement is only partially effective in that the front gang is not moved forward and movement of the rear gang is thereby limited.

An object of this invention is to provide a larger tractor mounted offset harrow in which both the front and rear gangs can be moved toward the tractor when the implement is raised to the transport position.

Another object of the invention is to provide a tractor mounted offset harrow which has a simple and inexpensive linkage arrangement for automatically folding the gangs into a transport position when the harrow is raised.

Still another object of this invention is to provide one simple adjustment which simultaneously changes the angle of both front and rear gangs.

A further object of this invention is to provide an offset disc harrow which uses its own weight to fold the gangs forward when the front of the frame is raised by the tractor.

Other objects and advantages will become apparent in the following description and drawings in which.

Figure 1:
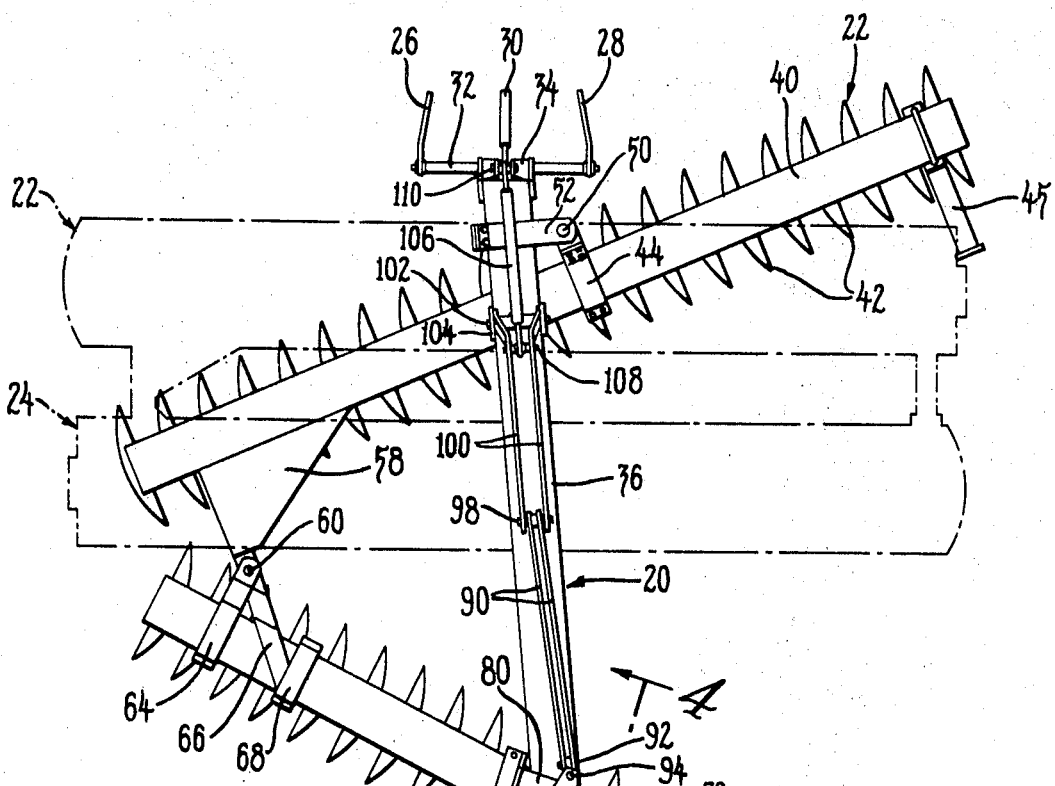
FIG. 1 is a plan view showing the disc harrow of the present invention in angled working position.

Referring more particularly to the FIG. 1, an offset disc harrow in which the principles of this invention have been incorporated includes a frame assembly generally indicated at 20, a front gang 22 and a rear gang 24. The frame 20 is shown connected to the lower draft links 26 and 28 and an upper link 30 of a tractor with a 3-point hitch system that is well-known by those skilled in the agricultural implement art.

Figure 2:
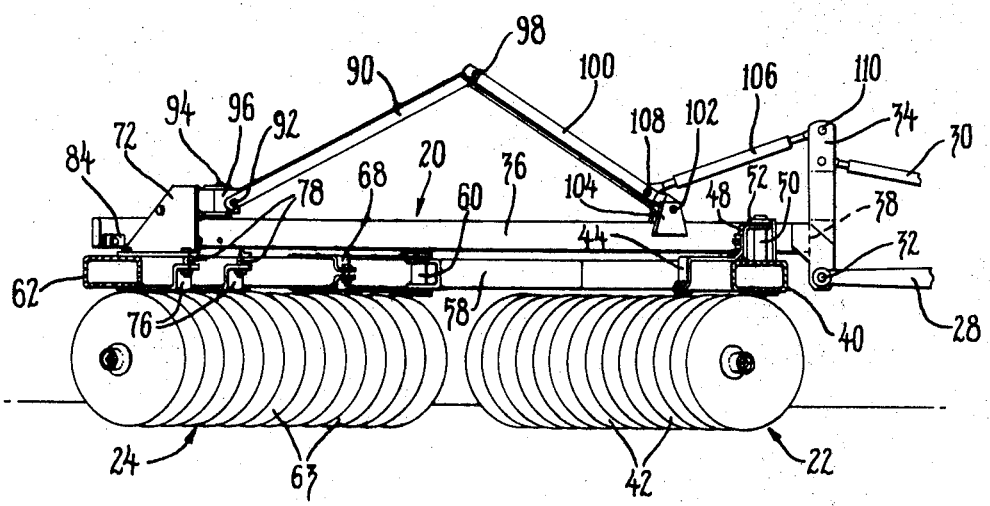
FIG. 2 is a side elevational view of the harrow showing the gangs in working position.
Figure 3:
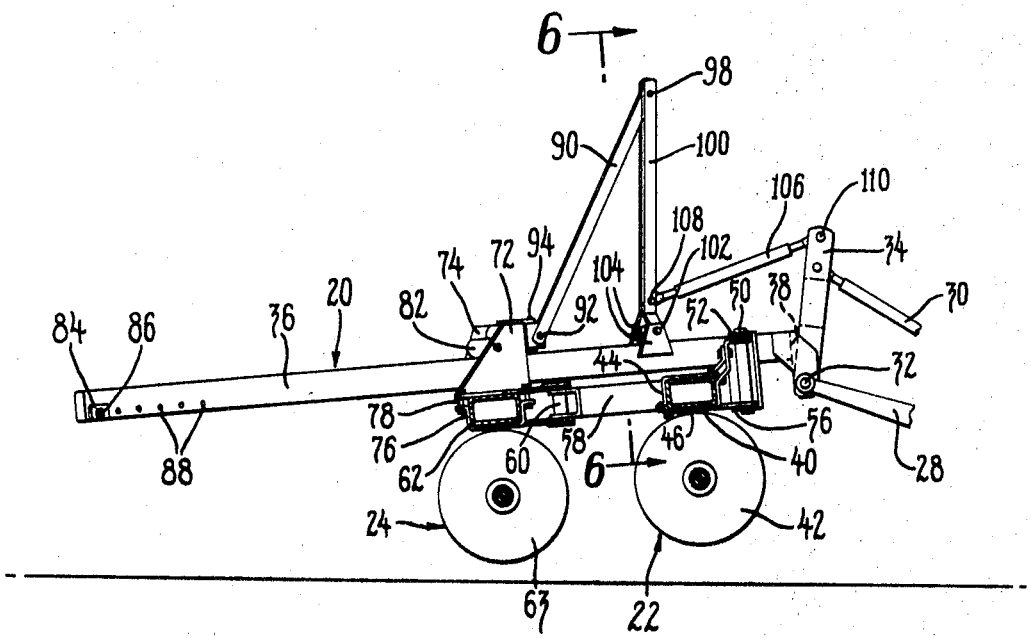
FIG. 3 is a side elevational view of the harrow with the gangs in transport position.

The frame assembly 20 includes a crossbar 32, a mast 34 and a hitch beam 36. As best shown in FIG. 3, the hitch beam 36 is pivotally attached on a horizontal axis to the mast 34. The forward end 38 of the hitch beam 36 abuts against the mast 34 to limit relative rotation between the mast and the hitch beam in a clockwise direction as shown in FIG. 2.

Figure 5:
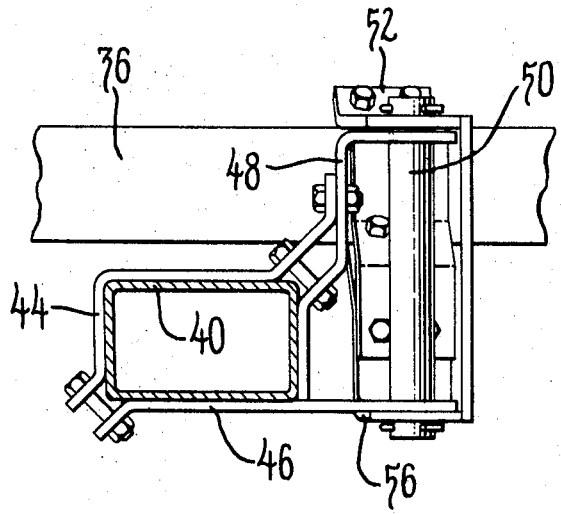
FIG. 5 is an enlarged detailed view of the front gang pivot point of FIG. 3.
Figure 6:
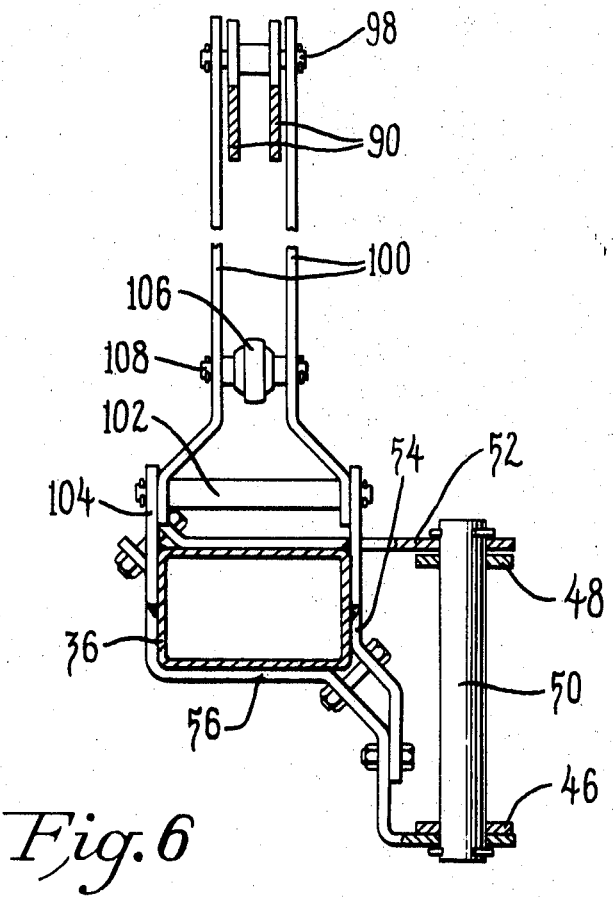
FIG. 6 is an enlarged sectional view of the front gang pivot point taken along lines 6—6 of FIG. 3.
Figure 7:
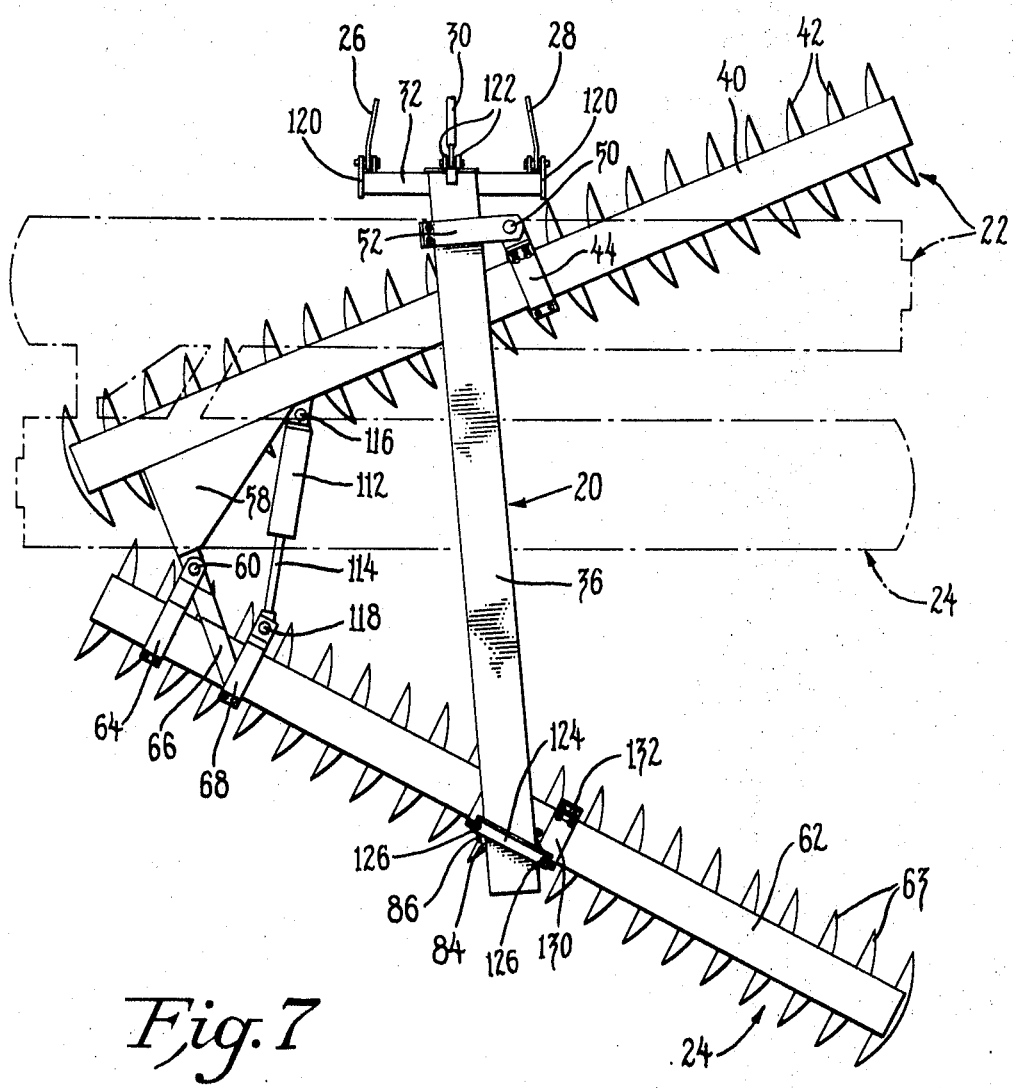
FIG. 7 is a plan view of another form of the disc harrow with the gangs in working position.

The front gang 22 includes a box frame member 40, a plurality of discs 42 rotatably attached under the box frame in a known manner and a stop member 45. The box frame 40 is pivotally attached to the hitch beam by brackets 44, 46 and 48, pin 50, and brackets 52, 54 and 56 as best shown in FIGS. 5 and 6. It will be seen that the further that brackets 52 and 56 and the pivot 50 extend to the right of the hitch beam as shown in FIGS. 1 and 7, the closer the whole front gang 22 will be to the tractor when pivoted into the dashed line transport position. A support member 58 is rigidly attached near one end of the box frame 40 to support a pivot pin 60. The rear gang 24 includes a box frame 62 with a plurality of discs 63 attached. Brackets 64, 66 and 68 are rigidly attached to the box frame and pivotally connect the same by pin 60 to the support member 58 on the front gang 22. The rear gang has a stop member 70 which contacts the stop 45 on the front gang when the gangs are folded into the transport position to prevent contact between the discs. The stops can be provided with springs (not shown) to take up shock if desired.

Figure 4:
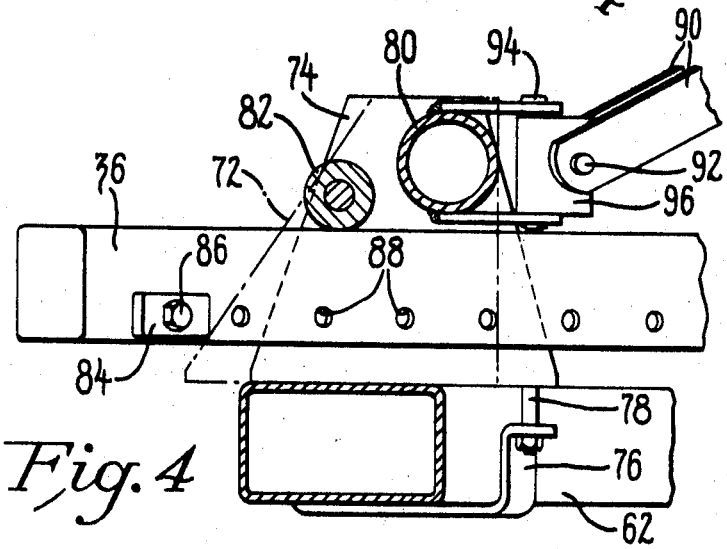
FIG. 4 is a sectional view taken along lines 4—4 of FIG. 1.

The rear gang 24 is slidably connected to the hitch beam by brackets 72 and 74 which are rigidly clamped to the box frame 62 near its center by clamps 76 and bolts 78 as seen in FIG. 4. A rigid tube member 80 is attached between the brackets 72 and 74. A roller 82 is rotatably supported between the brackets 72 and 74. When the implement and the beam 36 are raised from the ground by the tractor lift system, the roller 82 acts to support and lift the rear gang.

A stop member 84 may be attached near the rear of the hitch beam by a bolt 86 through one of the holes 88. The angle of the rear gang in the operative angled position can be adjusted to set the depth to which the discs cut into the ground by moving the stop 84 or by adjusting the length of the link member 106 as shown in FIG. 2. The stop member 84 is not used when the operative angled position of the gangs is set by adjusting the length of the link member 106. Because of the common pivot 60 between the front and rear gangs, a change in the angle of the rear gang will automatically change the angle of the front gang a proportional amount.

The hitch beam, as best shown in FIG. 1, extends from the center of the tractor, at an angle, to a position to the right side of the centerline of the tractor at its rear portion. This places the rear gang at a greater operating angle than the front gang as is normal in the art. When the gangs are closed for transport as shown by the broken lines in FIG. 1, the rear gang changes angle more than the front gang so that the gangs are perpendicular to the tractor centerline.

In the embodiment of FIGS. 1 to 6, the gangs are moved forward as shown in FIGS. 2 and 3, into a transport position by a mechanical linkage. The linkage includes parallel links 90 which are pivotally connected at one end to the tube member 80 by a universal joint having pins 92 and 94 and a joint member 96. The other ends of the parallel links 90 are pivotally connected by a pin 98 to one end of the levers 100. The levers 100 are in turn pivotally attached by a pin 192 to a bracket 104 which is rigidly secured to the forward section of the hitch beam. An adjustable length link 106 is connected at one end to the levers 100 at a point between the pins 98 and 102 by a pin 108 and at its other end to the top of the mast 34 by a pin 110.

When the draft links 26 and 28 are raised by the tractor, the weight of the rear gang and the hitch beam tends to pivot the hitch beam in a counterclockwise direction around the crossbar 32 as shown in FIG. 3. Also, as the draft links 26 and 28 are raised, the geometry of the 3-point hitch causes the top link 30 to pull the mast member 34 forward as seen in FIG. 3. This rearward tilting of the frame 36 and forward tilting of the mast 34 causes link 106 to pull on the lever arms 100 to rotate the same forwardly about pivot 102. The upper end of the levers 100 swing forward in a large arc pulling the parallel links 90 and the rear gang forward. As the rear gang 24 is moved forward, the roller 82 supports the gang on the beam 36. Movement of the rear gang 24 causes the pivot 60 to move forward and outwardly resulting in the front gang pivoting about the pivot 50 into the dashed line position of FIG. 1. After stops 45 and 70 have contacted each other, the members 106, 100 and 90 become relatively stationary causing further lifting by the tractor draft links 30 and 28 to raise the harrow as a unit. When the harrow is lowered, the rear gang will contact the ground first causing a drag on the rear gang. As the tractor moves forward, the gangs will unfold until the mast 34 contacts the front of the hitch and beam 36 and the gangs are in the full line in working position of FIG. 1.

Figure 8:
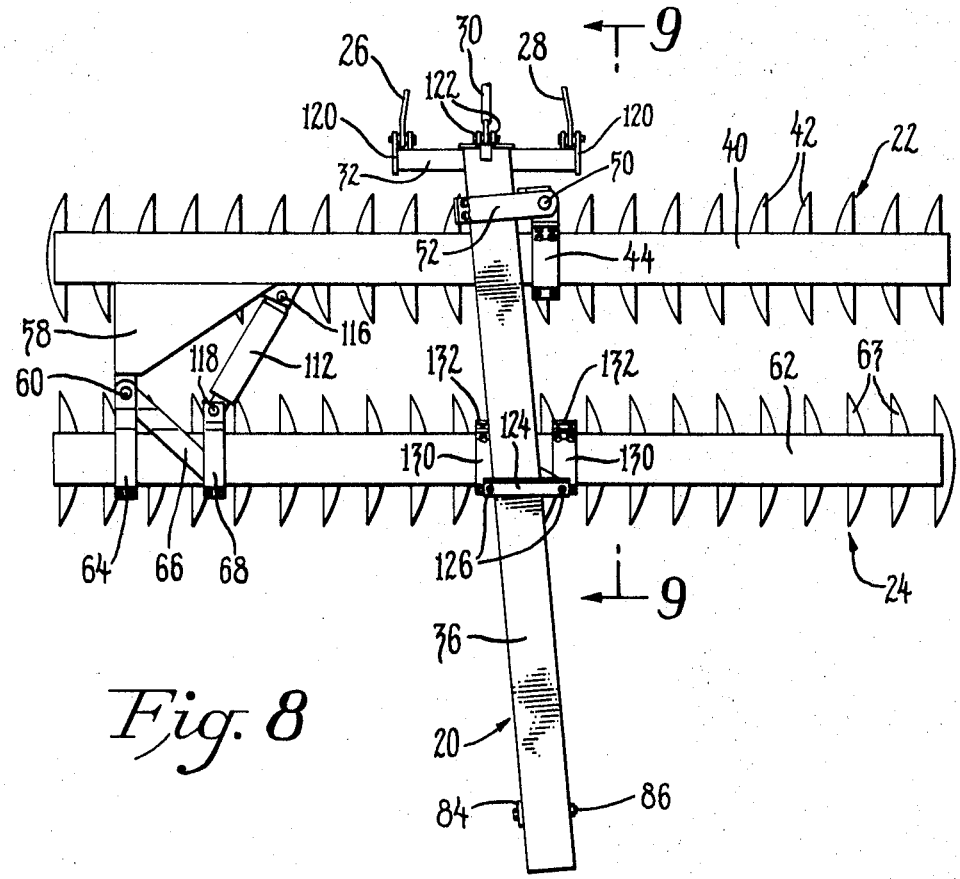
FIG. 8 is a plan view of the harrow of FIG. 7 with the gangs in transport position.
Figure 9:
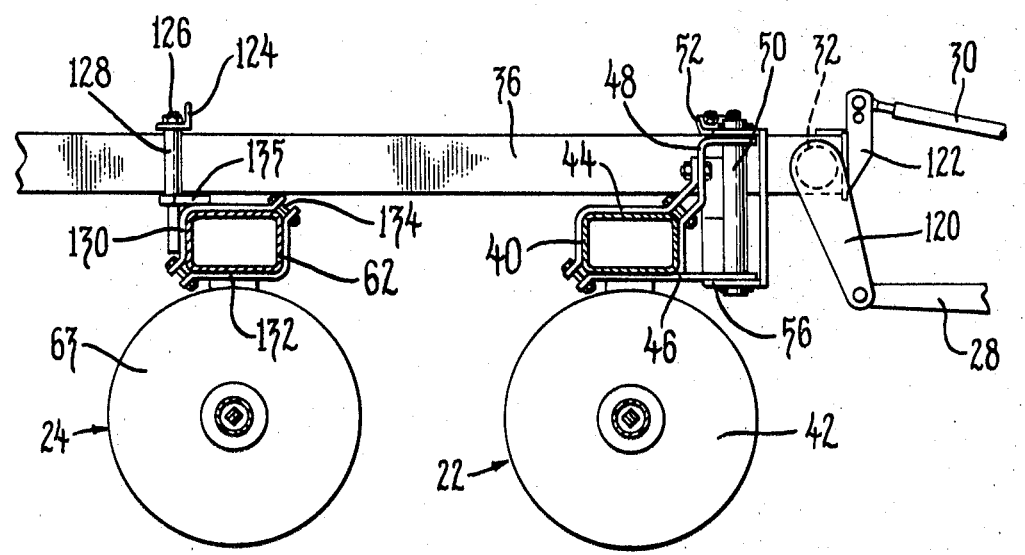
FIG. 9 is a fragmentary sided elevational view of the harrow shown in FIG. 7.

FIGS. 7, 8, and 9 show another embodiment of the invention. In this embodiment, the members 90, 100, 106 of the FIG. 1 to 6 apparatus have been replaced by a hydraulic cylinder 112 with a piston rod 114 connected to the front gang by a pin 116 and to the rear gang by a pin 118. This cylinder can move the gangs between a transport position and working positions when connected to a source of hydraulic pressure which is not shown. Also with this embodiment, the hitch beam 36 can be directly mounted to the tractor by rigid members 120 and 122. Since it is not necessary to pivot the hitch beam relative to the hitch, the implement can be raised higher by the draft links. FIGS. 7, 8, and 9 also show the rear gang slidably connected to the hitch beam by bolts 126, spacers 128 and an angle member 124. A separator member 135 maintains a space between the hitch beam 36 and the box frame member 62 so that the hitch beam will not contact the bolts 134. The bolts 126 are attached to the box frame 62 by two sets of adjustable brackets 130 and 132. Adjustment is made by loosening the bolts 134 and sliding the brackets on the box frame. This adjustment results in a change in the working angle of the front gang as well as the rear gang.

Although we have herein shown and described our invention in what we have conceived to be the most practical and preferred embodiments, it is recognized that departures may be made therefrom with the scope of our invention, which is not to be limited to the details disclosed herein, but is to be accorded the full scope of the following claims so as to embrace any and all equivalent devices:

We claim:

1. A mounted disc harrow adapted to be connected to and carried by the rearwardly extending, power-operated hitch links of a tractor, said disc harrow comprising a frame assembly, a 3-point hitch assembly with a crossbar and a mast mounted on the front portion of the frame assembly, a front gang pivotally attached at a point between its ends to the forward portion of the frame assembly, a rear gang with one end pivotally attached to the adjacent end of the front gang, means slidably connecting the rear gang at a point between its ends to the rear portion of the frame, and power means attached to the rear gang for positively folding both gangs relative to each other and relative to the frame assembly whereby the gangs can be moved from an operative angled position toward a transport position close to the front portion of the frame assembly and towards a position parallel to each other.

2. The mounted disc harrow of claim 1 wherein the frame assembly includes a hitch beam to which the rear gang is slidably connected.

3. The mounted disc harrow of claim 2 wherein the hitch beam extends to the rear of the hitch assembly and is angled toward one side of the hitch assembly.

4. The mounted disc harrow of claim 1 wherein the pivot point attaching the front gang to the frame assembly is located to the side of the frame assembly, relative to the center of the hitch assembly, opposite the common pivot point between front and rear gangs.

5. The mounted disc harrow of claim 1, wherein the power means for folding the gangs is connected to the front and rear gangs.

6. The mounted disc harrow of claim 1 wherein the mast is pivotally attached to the frame assembly and the power means for folding the gangs includes linkage means operatively connected to the rear gang and the mast to automatically move both gangs forward in response to pivotal movement of the mast relative to the frame assembly.

7. The mounted disc harrow of claim 6 wherein the linkage means includes at least one member with adjustable length to vary the angle between the gangs when in the operative angled position.

8. The mounted disc harrow of claim 3 wherein the pivot point attaching the front gang to the frame assembly is located to the side of the frame assembly, relative to the center of the hitch assembly, opposite the common pivot point between front and rear gangs.

9. The mounted disc harrow of claim 3 wherein the power means for folding the gangs is connected to the front and rear gangs.

10. The mounted disc harrow of claim 2 wherein the means for slidably connecting the rear gang to the hitch beam includes antifriction means.

11. A mounted disc harrow adapted to be connected to and carried by the rearwardly extending power-operated hitch links of a tractor, said disc harrow comprising a frame assembly, a 3-point hitch assembly with a crossbar and a mast mounted on the front portion of the frame assembly, a front gang, pivotally attached at a point between its ends to the frame assembly, a rear gang pivotally attached to the front gang and slidably connected to the frame assembly at a point between its ends, and means to automatically move both gangs towards the hitch assembly and substantially parallel to each other when said 3-point hitch assembly is raised.

12. The mounted disc harrow of claim 11 wherein the frame assembly includes a hitch beam and the mast is pivotal relative to the hitch beam about a horizontal axis.

13. A mounted disc harrow adapted to be connected to and carried by the rearwardly extending power-operated hitch links of a tractor, said disc harrow comprising a carrier frame assembly including, a mast, and a hitch beam pivotally attached to the mast on a horizontal axis; a front gang pivotally attached to the front portion of the frame assembly; a rear gang pivotally attached at one end to an adjacent end of the front gang and slidably connected to the rear portion of the hitch beam; and linkage members operatively connected to the mast and the rear gang to utilize the weight of the harrow to move the gangs, relative to each other and the frame assembly, toward a position near the front of the frame assembly and substantially parallel to each other when the top of the mast pivots forward relative to the hitch beam.